United States Patent

[11] 3,622,302

| [72] | Inventors | Noboru Hayashi<br>Amagasaki-shi;<br>Hidemi Kaida, Kakogawa-shi; Teruo<br>Takatsuki, Nishinomiya-shi, all of Japan |
|---|---|---|
| [21] | Appl. No. | 799,927 |
| [22] | Filed | Feb. 17, 1969 |
| [45] | Patented | Nov. 23, 1971 |
| [73] | Assignee | Kobe Steel, Ltd.,<br>Kobe-shi, Japan |
| [32] | Priority | Feb. 15, 1968 |
| [33] | | Japan |
| [31] | | 43/9751 |

[54] METHOD FOR REMOVING ARSENIC FROM METALS OR ALLOYS
13 Claims, No Drawings

[52] U.S. Cl. ..................................... 75/58,
75/82, 75/93, 75/130
[51] Int. Cl. ..................................... C21c 7/04,
C22b 23/00
[50] Field of Search .......................... 75/2, 6, 20,
58, 82, 130, 93

[56] References Cited
UNITED STATES PATENTS

| 1,335,370 | 3/1920 | Ellis .............................. | 75/58 X |
| 2,870,004 | 1/1959 | Estes et al. ..................... | 75/130 |
| 3,314,782 | 4/1967 | Arnaud .......................... | 75/57 |
| 3,415,642 | 12/1968 | Matsumoto .................... | 75/130 |
| 3,353,953 | 11/1967 | Schwarz ......................... | 75/6 |
| 3,453,101 | 7/1969 | Takahashi ....................... | 75/20 X |

Primary Examiner—L. Dewayne Rutledge
Assistant Examiner—G. K. White
Attorney—Jecies and Greendise ABSTRACT: Arsenic contained in ferronickel, pig iron, steel or crude nickel is effectively removed by adding at least one of calcium material, magnesium material and carbon material to the molten metal. Examples of the calcium material are Ca-Si, $CaC_2$, etc.; those of the magnesium material are Si-Mg, $MgF_2$, etc. and those of the carbon material are cokes powder, charcoal powder, etc.

METHOD FOR REMOVING ARSENIC FROM METALS OR ALLOYS

This invention relates to a method for effectively removing arsenic contained in metals or alloys, and more particularly, it concerns a method for removing arsenic contained in metals or alloys which comprises adding to molten metal containing arsenic at least one of calcium materials, magnesium materials and carbon materials as reducing agent.

It is well known that arsenic which cannot be removed in the usual steps for producing pig iron and steel remains in the final product as an impurity and most steels contain arsenic as one of the elements which are contained in a small amount. Many researches have been made on effects of arsenic on steel and ferroalloys to find that it has bad effects thereon. For example, regarding steel, arsenic lowers the mechanical properties and further causes red shortness to damage the hot workability. Regarding cast iron, arsenic lowers physical properties such as growth resistance and heat resistance, and mechanical properties such as impact value, tensile strength and deflection resistance, and further prevents spheroidizing of graphite. Arsenic has no good effects on any characteristics of steel or cast iron.

The conventional methods for removing arsenic from steel or ferroalloys which have been carried out by vaporization in vacuum or application of low frequency vibration require a special melting apparatus and further they are not satisfactory on the loss of iron, the efficiency for removal of arsenic and the reproducibility. Therefore, a method for effectively removing arsenic under normal pressure using the conventional smelting furnace or ladle has been waited for.

An object of this invention is to provide a method for simply and effectively removing arsenic from steel or ferroalloys which requires no expensive and special apparatus. Said object can be attained by adding to molten metal or alloy at least one of calcium materials, magnesium materials and carbon materials as reducing agent.

Arsenic belongs to Group V of the Periodic Table to which phosphorous also belongs and is a metal having the physical properties similar to those of phosphorus. However, it is impossible to remove arsenic as an arsenic oxide by the addition of lime, iron oxide and the like as in the dephosphorization of molten iron. That is, arsenic can be easily removed as an oxide in roasting of an ore, but when once the ore is reduced to produce metal iron and when arsenic is contained in the molten iron, arsenic cannot be removed as an oxide and rather it has been acknowledged that the concentration of arsenic is increased with the increase of the degree of oxidation atmosphere. Therefore, it is considered that although arsenic has the physical characteristics similar to those of phosphorus, the former is removed in a mechanism different from that of the removal of the latter.

The inventors made various experiments to establish the above facts. Further, as the results of various experiments using reducing atmosphere, not oxidizing atmosphere, they found that removal reaction of arsenic progresses under strongly reducing atmosphere. That is, arsenic contained in molten metal can be removed by adding to said molten metal a proper amount of at least one material selected from the group consisting of calcium materials, magnesium materials and carbon materials. Furthermore, the effects of the method of the invention are further heightened by stirring the resultant mixture. Said stirring may be carried out by the known method such as by top pouring method or by human power with a graphite rod or by a shaking ladle. The added reducing agent covers the surface of the molten metal as a slag and keeps equilibrium between the molten metal and atmosphere under reducing state.

The method of this invention is effective for removal of arsenic in ferronickel, but may be advantageously applicable to other ferroalloys, steel, pig iron, crude nickel, etc.

The examples of said reducing agent to be added to the molten metal are as follows:

Calcium materials.........Ca, CaSi, $Ca_2Si$, $CaSi_2$, Ca-Si, Ca-Si-Al, Ca-Si-Mg, Ca-Fe-Si, R[—Ca-Si] (R is a rare earth element such as Ce), $CaC_2$, $CaH_2$, $CaF_2$, $Ca[SiF_6]$.
Magnesium materials ...Mg, Si-Mg, Ni-Mg, Cu-Mg, Mg-Coke, $MgF_2$, $MgCl_2$, $Mg[SiF_6]$.
Carbon materials .........coke powders, charcoal powders, anthracite powders, electrode powders.

Further, the addition amount of said reducing agent which is expressed by the amount of element Ca, Mg or C is as follows:

Calcium materials.........Ca: 3.0 – 12% by weight, preferably about 6.2%.
Magnesium materials ...Mg: 2.0 – 8.0% by weight, preferably about 3.5%.
Carbon materials .........C: 4.0 – 16.0% by weight, preferably about 12.0%.

When two or more of the reducing agents are added, the amounts thereof should meet the following equation.

$$Mg + (2/4) C + (2/3) Ca = 2-8 \%$$

The upper limit of the amount of each reducing agent was experimentally determined in view of economical point and effect of removal of arsenic and the lower limit was also experimentally determined in view of the effect of removal. When the amount of the reducing agent is below the lower limit, almost all of the agent is consumed for desulfurization and removal of arsenic cannot be attained.

The calcium materials are especially suitable for removal of arsenic contained in ferronickel and the magnesium materials are suitable for treatment of pig iron.

The following examples are intended to illustrate the invention.

Examples

To about 50 kg. of each molten metal of ferronickel, pig iron, steel, and crude nickel which were molten in a high frequency furnace and contained arsenic, suitable amounts of said various reducing agents were added to keep the molten metals at a strongly reducing atmosphere and the mixture was vigorously stirred by human power or by using a shaking ladle. The results obtained are shown below.

1. Fe-Ni (25% Ni) was treated with calcium materials as reducing agents.

TABLE 1

| Test No. | Reducing agent | Amount of addition (percent by weight) | Manner of stirring | Time of stirring (min.) | As (percent) Before treatment | As (percent) After treatment | Removing percentage for arsenic (percent) |
|---|---|---|---|---|---|---|---|
| 1 | Additive B | 3.4 | Human power | 5 | 0.23 | 0.14 | 39.1 |
| 2 | $CaC_2$ | 4 | do | 6 | 0.34 | 0.12 | 64.7 |
| 3 | $CaC_2$ | 6 | do | 12 | 0.27 | 0.05 | 81.5 |
| 4 | $CaC_2$ | 8 | Shaking ladle | 7 | 0.34 | 0.03 | 91.2 |
| 5 | $CaC_2$ | 8 | Human power | 12 | 0.28 | 0.03 | 89.3 |
| 6 | $CaC_2$ | 10 | do | 12 | 0.28 | 0.01 | 96.5 |
| 7 | $CaC_2$ | 12 | do | 12 | 0.30 | 0.02 | 93.3 |

2. Fe-Ni (25% Ni) was treated with magnesium materials.

TABLE 2

| Test No. | Reducing agent | Amount of addition (percent by weight) | Manner of stirring | Time of stirring (min.) | As (percent) Before treatment | As (percent) After treatment | Removing percentage for arsenic (percent) |
|---|---|---|---|---|---|---|---|
| 1 | Mg-coke | 4 | Human power | 10 | 0.34 | 0.20 | 41.2 |
| 2 | do | 6 | Shaking ladle | 12 | 0.30 | 0.14 | 53.3 |

3. Pig iron was treated with calcium materials.

TABLE 3

| Test No. | Reducing agent | Amount of addition, percent by weight | Manner of stirring | Time of stirring, min. | As, percent Before treatment | As, percent After treatment | Removing percentage for arsenic percent |
|---|---|---|---|---|---|---|---|
| 1 | CaC$_2$, additive B | 1 5.1 | Shaking ladle. | 8 | 0.23 | 0.10 | 56.5 |
| 2 | CaC$_2$, additive A | 1 4.8 | ...do | 8 | 0.25 | 0.09 | 64.0 |
| 3 | CaC$_2$, additive A | 1 6.4 | ...do | 8 | 0.28 | 0.09 | 67.9 |
| 4 | CaC$_2$ | 4 | ...do | 8 | 0.21 | 0.08 | 61.9 |
| 5 | CaC$_2$ | 6 | ...do | 10 | 0.29 | 0.05 | 82.7 |
| 6 | CaC$_2$ | 8 | ...do | 10 | 0.28 | 0.03 | 89.2 |

4. Pig iron was treated with magnesium materials.

TABLE 4

| Test No. | Reducing agent | Amount of addition, percent by weight | Manner of stirring | Time of stirring, min. | As, percent Before treatment | As, percent After treatment | Removing percentage for arsenic, percent |
|---|---|---|---|---|---|---|---|
| 1 | Mg-coke | 4 | Shaking ladle. | 8 | 0.22 | 0.06 | 72.7 |
| 2 | ...do | 6 | ...do | 8 | 0.22 | 0.04 | 81.8 |

5. Pig iron was treated with carbon materials.

TABLE 5

| Test No. | Reducing agent | Amount of addition, percent by weight | Manner of stirring | Time of stirring, min. | As, percent Before treatment | As, percent After treatment | Removing percentage for arsenic, percent |
|---|---|---|---|---|---|---|---|
| 1 | Electrode powder | 6 | Shaking ladle. | 15 | 0.30 | 0.25 | 16.7 |
| 2 | Cokes powder | 10 | ...do | 15 | 0.29 | 0.15 | 48.3 |

6. Steel was treated with calcium materials.

TABLE 6

| Test No. | Reducing agent | Amount of addition, percent by weight | Manner of stirring | Time of stirring, min. | As, percent Before treatment | As, percent After treatment | Removing percentage for arsenic, percent |
|---|---|---|---|---|---|---|---|
| 1 | CaC$_2$, additive A | 2 | Human power. | | 0.12 | 0.06 | 50.0 |
| 2 | CaC$_2$ | 6 | ...do | 8 | 0.12 | 0.03 | 69.2 |

7. Crude nickel was treated with calcium materials and magnesium materials.

TABLE 7

| Test No. | Reducing agent | Amount of addition, percent by weight | Manner of stirring | Time of stirring, min. | As, percent Before treatment | As, percent After treatment | Removing percentage for arsenic, percent |
|---|---|---|---|---|---|---|---|
| 1 | CaC$_2$ Mg-coke | 1 4 | Human Power. | 10 | 1.34 | 0.85 | 36.6 |

Note:
1. Additive A comprises 70 parts of Ca-Si and 10 parts of MgF$_2$. Additive B comprises 60 parts of Ca-Si and five parts of MgF$_2$.
2. Composition of Ca-Si...Ca 33%
   Si 67%
   Composition of Mg-Coke...Mg 40%
   Coke 60%
3. Chemical composition of Fe-Ni (25% Ni) is as follows:

| Ni | Co | As | C | Si | S | Cu | Cr |
|---|---|---|---|---|---|---|---|
| 24.74 | 0.43 | 0.28 | 0.02 | 0.01 | 0.021 | 0.03 | 0.03 |

The arsenic removing treatment according to this invention resulted in no influence on other components in the metal or alloy treated.

What we claim is:

1. A method for removing arsenic from metal or alloy substances, said method comprising forming a melt of said substance and adding to the melt, for removing arsenic, at least one reducing agent selected from the group consisting of calcium, magnesium and carbon materials, the amount of arsenic removed being from about 16.7 to 96.5 percent.

2. A method according to claim 1, wherein said calcium material is a member selected from the group consisting of Ca, CaSi, Ca$_2$Si, CaSi$_2$, Ca-Si, Si, Ca–Si–al. Ca–Si–Mg. Ca–Fe–Si, R[–CaAYSi], CaC$_2$, CaH$_2$, CaF$_2$ and Ca[SiF$_6$[.

3. A method according to claim 1, wherein said magnesium material is a member selected from the group consisting of mg. Si–Mg Ni–Mg Cu–Mg Mg–coke, $MgF_2$, $MgCl_2$ and $Mg[SiF_6]$.

4. A method according to claim 1, wherein said carbon material is a member selected from the group consisting of cokes powders, charcoal powders, anthracite powders and electrode powders.

5. A method according to claim 1, wherein said calcium material is added in an amount by weight of 3.0–12 percent expressed by the amount of element calcium.

6. A method according to claim 1, wherein said magnesium material is added in an amount by weight of 2.0–8.0 percent expressed by the amount of element magnesium.

7. A method according to claim 1, wherein said carbon material is added in an amount by weight of 4.0–16.0 percent expressed by the amount of element carbon.

8. A method according to claim 1, wherein at least two materials are added in an amount by weight which satisfy the following equation, $$Mg + 2/4C + 2/3Ca2-8\%.$$

9. A method according to claim 1, wherein the metal to be treated is a member selected from the group consisting of ferronickel, steel, pig iron and crude nickel.

10. A method according to claim 1, wherein the molten metal to which the material is added is vigorously stirred.

11. A method according to claim 1, wherein Ca–Si and $MgF_2$ are added.

12. A method according to claim 1, wherein Ca–Si, $MgF_2$ and $CaC_2$ are added.

13. A method according to claim 1, wherein $CaC_2$ and Mg–coke are added.

* * * * *